United States Patent [19]

Nakajima

[11] Patent Number: 4,956,020

[45] Date of Patent: Sep. 11, 1990

[54] INHIBITING POPCORN POLYMER GROWTH

[75] Inventor: Sadao Nakajima, Mie, Japan

[73] Assignee: Hakuto Chemical Co., Ltd., Tokyo, Japan

[21] Appl. No.: 345,124

[22] Filed: Apr. 28, 1989

[51] Int. Cl.$^5$ .............................. B08B 9/00
[52] U.S. Cl. .................... 134/22.19; 585/3; 585/4; 585/5
[58] Field of Search ............ 134/22.19; 585/3, 4, 585/5

[56] References Cited

U.S. PATENT DOCUMENTS

| | | | |
|---|---|---|---|
| 3,371,124 | 2/1968 | Albert et al. | 585/4 |
| 3,432,563 | 3/1969 | Metzler | 585/4 |
| 3,526,673 | 9/1970 | Albert | 585/5 |
| 4,556,476 | 12/1985 | Miller et al. | 585/950 |
| 4,654,451 | 3/1987 | Miller et al. | 585/5 |
| 4,863,524 | 9/1989 | Komabashiri et al. | 134/22.19 |

OTHER PUBLICATIONS

Georgieff, K. K., "Rapid Build-up of a Pyrophoric Polymer in Ethylene Plant Deethanizer and Depropanizer Columns", 62, *The Canadian Journal of Chemical Engineering*, Jun. 1984 at 367.

*Primary Examiner*—Curtis R. Davis
*Attorney, Agent, or Firm*—Fitch, Even, Tabin & Flannery

[57] ABSTRACT

Popcorn polymer growth on the inner surface of an olefin production apparatus is inhibited by treating a popcorn polymer with an efficient amount of a popcorn polymer growth inhibitor while the operation of the apparatus is suspended and olefins are removed from the apparatus.

8 Claims, No Drawings

INHIBITING POPCORN POLYMER GROWTH

BACKGROUND OF THE INVENTION

1. Field of the Invention

This invention relates to a method for the inhibition of popcorn polymer growth by treating a popcorn polymer with a popcorn polymer growth inhibitor while the operation of the apparatus is suspended and the apparatus is maintained in a state destitute of olefins for the purpose of precluding the cumulative adhesion of olefins (referring collectively to all hydrocarbons possessing at least one double bond and derivative thereof) to the recovery system or the refining system.

2. Description of the Prior Art

In the production of an olefin, a so-called popcorn polymer of a porous three-dimensional structure occurs accidentally and not infrequently in the apparatus owing to the polymerization of the olefin in the step of refining and recovery or in the step of recovering the unaltered monomer after termination of the polymerization during the production of synthetic rubber. This popcorn polymer occurs both in the gaseous phase and the liquid phase. It is more likely to occur where the concentration of the monomer (olefin) is high and the temperature is high. A minute amount of oxygen (peroxide) acts as an initiator for the reaction of polymerization and starts the reaction. Iron rust, if any, accelerates the reaction of popcorn polymerization to a great extent.

Numerous monomers containing such olefins as styrene, α-methyl styrene, acrylic acid and esters thereof, vinyl acetate, acrylonitrile, acrylamide, methacrylamide, etc. and such diolefins as 1,3-butadiene, isoprene, and chloroprene, on reaching refining devices during the step of production and the step of recovery, assume certain conditions such as those related to temperature, monomer concentration, coexistence of vapor and liquid phase, humidity, trace oxygen and iron rust which are highly conducive to the occurrence of popcorn polymerization.

The popcorn polymer is disposed to forming "seeds" which may continue to propagate until the monomer ceases to exist in must the same way as cancerous cells. Because of this nature, minute particles of the popcorn polymer so formed at all rapidly grow into large lumps of polymer. The popcorn polymer therefor adheres to and defiles the heat-exchanger, distillation tower, and piping installed within the system for refining and recovering the produced olefin and deteriorates the efficiency of the refining operation. It often clogs the apparatus and its piping. In an extreme case, the mechanical pressure generated during the propagation of the polymer may deform and fracture the apparatus.

The reason for the rapid propagation of the popcorn polymer is that, as the polymer grows, radically active sites are newly formed inside the polymer and the polymer attains growth from the newly formed radically active sites. It is a surprising fact that the (radically) active sites existing inside the polymer have a long life. When the polymer exposed to the ambient air during suspension of the operation of the apparatus is brought into contact with the monomer as a result of the resumption of the operation, it again starts growing and propagating from the active sites present therein.

The popcorn polymer is of such a quality that it is insoluble in all solvents and defies fusion by heating. For the removal of the mischievous popcorn polymer, the apparatus must be disassembled and mechanically cleaned. Temporary suspension of the apparatus and the cleaning thereof bring about an immense economic loss.

Numerous inhibitors have been proposed for the purpose of precluding the occurrence of this popcorn polymer phenomenon. Examples are nitrites, nitrogen oxides, nitroso compounds, alkyl phenols, aromatic amines, hydroxylamines, etc. For these inhibitors to be effectively used, they must be continuously injected into the apparatus during its operation. These conventional inhibitors curb the growth of the popcorn polymer when the apparatus is clean. They have a serious drawback, however, in that they are deprived of effectiveness in the presence of "seeds" of popcorn polymer. If the popcorn polymer defies being removed by the mechanical cleaning performed during the suspension of the operation, it gives rise to "seeds" for further propagation, and the conventional inhibitors are no longer capable of curbing the propagation of popcorn polymer which starts after the resumption of the operation.

SUMMARY OF THE INVENTION

It is an object of the invention to provide a method for the inhibition of popcorn polymer growth by treaing a popcorn polymer with a popcorn polymer growth inhibitor while the operation of the apparatus is suspended and the apparatus is maintained in a state destitute of olefins for the purpose of precluding the cumulative adhesion of olefins to the recovery system or the refining system.

Other objects and advantages of the present invention may become apparent to those skilled in the art from the following description.

DESCRIPTION OF THE PREFERRED EMBODIMENT

The popcorn polymer growth inhibitor for use in the olefin production apparatus is formed by using as a main component thereof at least one compound selected from the group consisting of hydroquinone, 2,6-di-t-butyl-p-cresol, N,N'-di-sec-butyl-p-phenylene-diamine, and phenothiazine, at least one compound selected from the group of 2-methyl-4-nitroso-phenol, N-nitroso-phenyl hydroxylamine, and p-nitroso phenol, at least one compound selected from the group consisting of hydroxylamine, N,N-diethylhydroxylamine, hydrazine, monoethanol amine, and ethylene diamine, or at least one compound selected from the group consisting of octyl mercaptan and thioglycolic acid 2-ethylhexyl ester.

The inhibitor of this invention is prepared in the form of a solution having this inhibitor dissolved in a concentration in the range of 0.5 to 10% by weight, preferably 1 to 5% by weight, in water and/or a water-soluble organic solvent represented by alcohol or a mineral oil. When the operation of the olefin production apparatus is suspended, treatment of the inner surface of the apparatus can be readily accomplished to an extent sufficient to contribute to suppression of the polymer growth by filling the interior of the apparatus with the solution while the interior of the apparatus is in what is called a state destitute of any olefins. The purpose of this treatment can be adequately achieved if the interior of the apparatus is filled with solution for about 24 hours. Optionally, the duration of this treatment may be shortened by circulating the inhibitor through the apparatus with a pump or spraying the inhibitor on the inner surface of the apparatus and consequently enhancing the effect of the treatment. When the treatment of the inner surface of the apparatus is completed, the used inhibitor is removed from the apparatus and recovered. The small amount of inhibitor remaining in the apparatus may be easily removed by flushing with water or with the water-soluble organic solvent or mineral oil used as the solvent for this inhibitor. After the removal of the used inhibitor, the apparatus is charged with the raw material and then put into normal operation.

When the inhibitor of this invention is used in a concentration that does not reach the prescribed level mentioned above, it brings about a discernible effect but not one sufficient to curb the occurrence of the popcorn polymer. If it is used in a concentration exceeding the prescribed level, the excess is wasted and is not used to advantage. The conditions under which the inhibitor of this invention is used are not critical.

The inhibitor can be used as effectively under the application of pressure as under a vacuum. It is used as effectively at elevated temperatures as at low temperatures. Though the immersion time is desired to be as long as possible, roughly 24 hours' immersion suffices for the purpose of inhibition.

Incorporation of a surfactant in the inhibitor of this invention is effective in enhancing the inhibitor's penetrating power and wetting power. Preferred examples of the surfactant are Pluronic type and Tetronic type alkylphenol ethylene oxide adducts.

The preferred embodiment of this invention and the effect thereof will be described more specifically below with reference to the following working examples.

EXAMPLE 1

Popcorn polymer particles collected from a heat exchanger of a butadiene refining plant were immersed at room temperature for 24 hours in a solution containing the inhibitor of this invention. They were thoroughly washed with a solvent used for each inhibitor for complete removal of the adhering inhibitor and then dried under a vacuum. In a pressure vessel having an inner volume of 100 ml and containing 20 g of refined styrene was placed, a 0.2 g portion of the cleaned popcorn polymer particles. The vessel, with the interior thereof filled with nitrogen, was left standing in a constant temperature bath at 60° C. for 6 days. The polymer consequently formed was treated with hot toluene to remove linear polymer. The remaining popcorn polymer was weighed to determine the increase in weight of popcorn polymer. For comparison, the same polymer particles but which had not been given the treatment described above were subjected to the procedure described above. The results are shown in Table 1.

TABLE 1

| | Inhibitor of this invention | Increase of weight of popcorn polymer (%) |
|---|---|---|
| Ex. | Hydroquinone (10 wt %) in water and ethanol (50:50 wt %) | 2.67 |
| | 2,6-di-t-butyl-p-cresol (10 wt %) in xylene | 1.85 |
| | N-N'-di-sec-butyl-p-phenylenediamine (10 wt %) in xylene | 0.28 |
| | Phenothiazine (10 wt %) in acetone | 5.04 |
| | 2-methyl-4-nitroso phenol (10 wt %) in xylene | 1.41 |
| | N-nitroso-phenyl hydroxylamine (10 wt %) in xylene | 0.12 |

TABLE 1-continued

| | Inhibitor of this invention | Increase of weight of popcorn polymer (%) |
|---|---|---|
| | P-nitroso-phenol (10 wt %) in acetone | 0.75 |
| | Hydroxylamine (10 wt %) in water | 0.42 |
| | N,N-diethyl hydroxylamine (10 wt %) in water | 0.35 |
| | Hydrazine (10 wt %) in water | 1.02 |
| | Monoethanol amines (10 wt %) in water | 1.87 |
| | Ethylene diamine (10 wt %) in water | 2.58 |
| | Octyl mercaptan (10 wt %) in xylene | 3.69 |
| | Thioglycolic acid 2-ethylhexylester (10 wt %) in xylene | 0.74 |
| Comp. Ex. | $NaNO_2$ (10 wt %) in water | 12.4 |
| | N-nitroso diphenylamine in xylene | 16.0 |
| | Blank (xylene washing) | 15.72 |
| | Blank (water washing) | 16.70 |

EXAMPLE 2

The procedure of Example 1 was faithfully repeated, except that 20 g of 1,3-butadiene was used as a test specimen and the number of days the vessel was left standing in the constant temperature bath was changed to 14. The results are shown in Table 2.

TABLE 2

| | Inhibitor of this invention | Increase of weight of popcorn polymer (%) |
|---|---|---|
| Ex. | Hydroquinone (10 wt %) in water and ethanol (50:50 wt %) | 0.15 |
| | 2,6-di-t-butyl-p-cresol (10 wt %) in xylene | 0.04 |
| | N-N'-di-sec-butyl-p-phenylenediamine (10 wt %) in xylene | 0.05 |
| | Phenothiazine (10 wt %) in acetone | 0.60 |
| | 2-methyl-4-nitroso-phenol (10 wt %) in xylene | 0.12 |
| | N-nitroso-phenyl hydroxylamine (10 wt %) in xylene | 0.02 |
| | P-nitroso-phenol (10 wt %) in acetone | 0.06 |
| | Hydroxylamine (10 wt %) in water | 0.04 |
| | N,N-diethyl hydroxylamine (10 wt %) in water | 0.02 |
| | Hydrazine (10 wt %) in water | 0.07 |
| | Monoethanol amines (10 wt %) in water | 0.19 |
| | Ethylene diamine (10 wt %) in water | 0.43 |
| | Octyl mercaptan (10 wt %) in xylene | 0.33 |
| | Thioglycolic acid 2-ethylhexylester (10 wt %) in xylene | 0.25 |
| Comp. Ex. | $NaNO_2$ (10 wt %) in water | 2.44 |
| | N-nitroso diphenylamine in xylene | 1.85 |
| | Blank (xylene washing) | 2.41 |
| | Blank (water Washing) | 2.26 |

EXAMPLE 3

The depropanizer in an ethylene plant receives a fraction larger than $C_3$, effects distillation of the received fraction, and discharges $C_3$ fractions such as propane through the tower top and fractions larger than $C_4$ through the tower bottom. Since such olefins such as 1,3-butadiene, butene, cyclopentadiene, indene, and styrene are present in high concentrations in the bottom, the boiler for supplying heat at the bottom and the pipe for discharging the bottoms are always defiled with the popcorn polymer.

When the bottom part of the depropanizer, the reboiler, and the bottoms discharge pipe in the actual plant were immersed for 40 hours in an aqueous solution containing the inhibitor of this invention (N,N-diethyl hydroxylamine:monoethanol amine:hydrazine=1:1:1, weight ratio) in a concentration of 3% by weight of an aqueous solution, put to normal use for one year, and visually inspected during periodic disassembly and maintenance, substantially no defilement was detected where normally serious smearing with the popcorn polymer would be observed. Thus, the effectiveness of the treatment was confirmed.

What is claimed is:

1. A method for the inhibition of popcorn polymer growth by treating a popcorn polymer on the inner surface of an olefin production apparatus with a popcorn polymer growth inhibitor in an amount of 0.5 to 10% by weight in a medium while the operation of the apparatus is suspended and olefins are substantially removed from the apparatus, said popcorn polymer growth inhibitor comprising one compound selcted from the group consisting of hydroquinone, 2,6-di-t-butyl-p-cresol, N,N'-di-sec-butyl-p-phenylnediamine, phenothiazine, 2-methyl-4-nitroso-phenol, N-nitrosophenyl hydroxylamine, p-nitroso phenyl, hydroxylamine, N,N-diethylhydroxylamine, hydrazine, monoethanol amine, ethylene diamine, octyl mercaptan and thioglycolic acid 2-ethylhexyl ester, said medium comprising one member selected from the group consisting of water, a water-soluble organic acid and a mineral oil.

2. A method according to claim 1 wherein the inhibitor is in an amount of 1 to 5% by weight.

3. A method according to claim 1 wherein said medium comprises at least one member selected from the group consisting of water and a water-soluble organic solvent.

4. A method according to claim 1 wherein said inhibitor comprises at least one compound selected from the group consisting of hydroquinone, 2,6-di-t-butyl-p-cresol, N,N'-di-sec-butyl-p-phenylenediamine, and phenothiazine.

5. A method according to claim 1 wherein said inhibitor comprises at least one compound selected from the group consisting of 2-methyl-4-nitroso-phenol, N-nitrophenyl hydroxylamine, and p-nitroso phenol.

6. A method according to claim 1 wherein said inhibitor comprises at least one compound selected from the group consisting of hydroxylamine, N,N-diethyl hydroxylamine, hydrazine, monoethanol amine, and ethylene diamine.

7. A method according to claim 1 wherein said inhibitor comprises at least one of compound selected from the group consisting of octyl mercaptan and thioglycolic acid 2-ethylhexyl ester.

8. A method according to claim 1 wherein said inhibitor comprises at least one compound selected from the group consisting of hydroxylamine, N,N-diethyl hydroxylamine, hydrazine, monoethanol amine, ethylene diamine, octyl mercaptan and thioglycolic acid 2-ethylhexyl ester.

* * * * *

UNITED STATES PATENT AND TRADEMARK OFFICE
CERTIFICATE OF CORRECTION

PATENT NO. : 4,956,020
DATED : September 11, 1990
INVENTOR(S) : Nakajima

It is certified that error appears in the above-identified patent and that said Letters Patent is hereby corrected as shown below:

ON TITLE PAGE:

Inventor:, after "Nakajima", change "Mie" to --Mie-ken--.

Column 1, line 44, change "must" to --much--.
Column 2, line 27, change "treaing" to --treating--.
Column 4, line 53, change "Washing" to --washing--.
Column 4, line 61, delete "such" (second occurrence).

IN THE CLAIMS:

Claim 1, column 5, line 20, change "selcted" to --selected--.

Claim 1, column 5, line 22, change "phenylnediamine" to --phenylenediamine--.

Signed and Sealed this

Tenth Day of March, 1992

*Attest:*

HARRY F. MANBECK, JR.

*Attesting Officer*     *Commissioner of Patents and Trademarks*